(12) United States Patent
Ueno (10) Patent No.: US 7,580,442 B2
(45) Date of Patent: Aug. 25, 2009

(54) RECEIVING APPARATUS, RECEIVING METHOD AND PROGRAM THEREOF

(75) Inventor: Masayoshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 581 days.

(21) Appl. No.: 11/312,539

(22) Filed: Dec. 21, 2005

(65) Prior Publication Data

US 2006/0133458 A1  Jun. 22, 2006

(30) Foreign Application Priority Data

Dec. 22, 2004  (JP) .............................. 2004-370323

(51) Int. Cl.
*H04B 1/00* (2006.01)
(52) U.S. Cl. .................... 375/130; 375/347; 375/349
(58) Field of Classification Search ................ 375/145, 375/149, 260, 347, 349, 130
See application file for complete search history.

(56) References Cited

U.S. PATENT DOCUMENTS

| 6,373,882 | B1 * | 4/2002 | Atarius et al. ............... 375/148 |
| 6,549,545 | B1 | 4/2003 | Yamamoto et al. |
| 6,580,749 | B1 * | 6/2003 | Miura ......................... 375/147 |
| 7,010,019 | B2 * | 3/2006 | Reial ........................... 375/148 |
| 7,116,998 | B2 * | 10/2006 | Wang et al. .................. 455/506 |
| 7,162,239 | B2 * | 1/2007 | Tohono ....................... 455/434 |
| 2002/0022463 | A1 | 2/2002 | Mori et al. |
| 2003/0050022 | A1 * | 3/2003 | Kuroiwa et al. ............. 455/133 |
| 2004/0203405 | A1 * | 10/2004 | Reial et al. ................... 455/65 |
| 2005/0088987 | A1 * | 4/2005 | Ryu .......................... 370/328 |

FOREIGN PATENT DOCUMENTS

| JP | 2001-223613 A | 8/2001 |
| JP | 2002-111548 A | 4/2002 |
| JP | 2002-141833 A | 5/2002 |
| JP | 2003-110459 A | 4/2003 |

OTHER PUBLICATIONS

3GPP TS 25.214, "Annex C (Informative): Cell Search Procedure," Physical Layer Procedures (FDD), Release 6, Sep. 2004.

* cited by examiner

*Primary Examiner*—Jean B Corrielus
(74) *Attorney, Agent, or Firm*—Sughrue Mion, PLLC (57) ABSTRACT

A receiving apparatus adjusts a path search window width in path search processing according to the saved timing information, after saving timing information detected at the time of cell search processing. A Radio Frequency (RF) unit receives signals which are sent from a base station and transmitted via a plurality of paths (multi-path). A cell search unit detects scrambling codes specific to the base station in received signals and generates timing information corresponding to the multi-path signals when the same scrambling code is detected in a plurality of timings. A path timing memory unit saves each of the timing information for each of the multi-path signals. A path search unit controls a search window width and search start timing in reference to the timing information of the same scrambling code to perform a path search.

14 Claims, 8 Drawing Sheets

| SCRAMBLING CODE | TIMING | CORRELATION VALUE |
|---|---|---|
| A | t1 | r1 |
| A | t2 | r2 |
| A | t3 | r3 |
| B | t4 | r4 |
| ⋮ | ⋮ | ⋮ |

RECEIVING APPARATUS, RECEIVING METHOD AND PROGRAM THEREOF

BACKGROUND OF THE INVENTION

1. Field of the Invention

The present invention relates to a receiving apparatus and receiving method, and more particularly, to a receiving apparatus and receiving method for receiving and demodulating signals transmitted from a base station by spread spectrum communication.

2. Description of the Related Art

In mobile communication, code division multiple access (CDMA) communication is used widely. In code division multiple access (CDMA) communication, information sent via a plurality of channels or information sent from users is multiplexed with a spreading code and is transmitted via a radio line.

Figure 8:
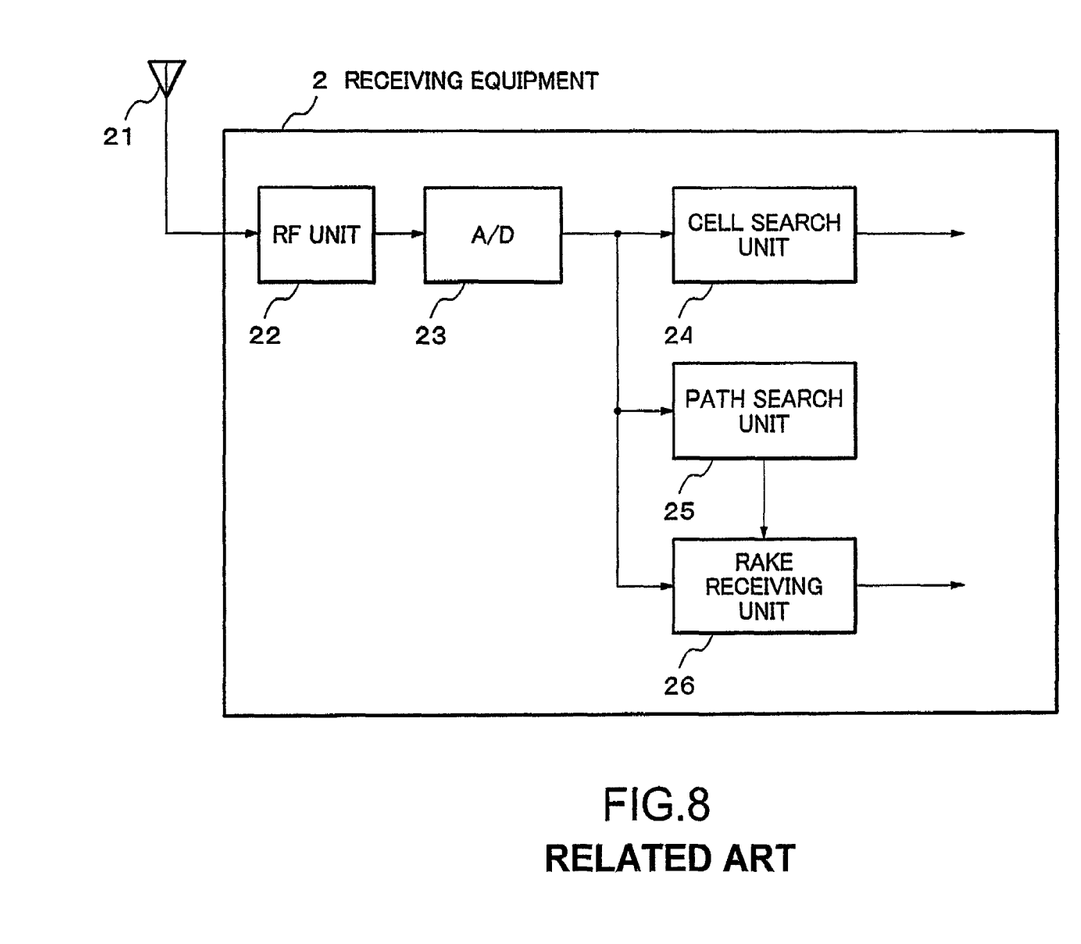
FIG. 8 is a block diagram showing a structure of a conventional CDMA receiving apparatus.

A conventional receiving apparatus 2, as shown in FIG. 8, includes an antenna 21, a Radio Frequency (RF) unit 22, an analog-to-digital converter (A/D) 23, a cell search unit 24, a path search unit 25, and a RAKE receiving unit 26. The conventional receiving apparatus 2 operates as follows.

A plurality of signals caught with the antenna 21 is frequency-converted by the RF unit 22, and converted into digital signals by the A/D 23. The digital signals are supplied to each of the cell search unit 24, the path search unit 25, and the RAKE receiving unit 26.

The cell search unit 24 detects a neighboring cell and measures its received electric power, and detects a scrambling code and frame timing of a base station (not shown).

The path search unit 25 receives the digital signals output from the A/D 23, searches them for multi-path, and outputs each of path timings.

The RAKE receiving unit 26 refers to the path timings (information) output from the path search unit 25, performs a despreading process on each path of the digital signals which are output from the A/D 23, demodulates into the original data from symbol data obtained by despreading, and combines and outputs demodulated results.

Namely, this conventional receiving apparatus 2 has selected a high level path detected in the range of the search detection window assumed beforehand as an effective path at just time of detection of a neighboring cell (base station candidate). However, for example, in a surrounding environment which has only a direct wave, delay profile will be created vainly and power consumption will be wasted. Moreover, when the search detection window was narrowed for reduction of power consumption, degradation of receiving quality was caused without a required path being combined, depending on the surrounding environment.

As an example which solves such a problem, there is a radio receiving apparatus capable of performing a highly precise path search (see, JP 2003-110459). This apparatus finely searches only in the neighborhood of a path candidate about a PRACH message portion by using a phase of path candidate searched when a preamble portion of Physical Random Access Channel (PRACH) was received.

Moreover, there is a mobile communication terminal capable of performing a path search exactly about a range over which effective paths are distributed (see, JP 2002-141833). This terminal searches for a center of gravity of a distribution of a plurality of paths suitable for reception, and performs path search in the range based on the center of gravity.

Furthermore, there is a radio receiving apparatus capable of changing path search window width based on an amount of delay (see, JP 2002-111548). This apparatus judges an amount of delay of a path with amount of maximum delay from a path timing which has a peak level, and presupposes a window width of a path search based on the amount of delay.

What is more, there is a receiver of the spread spectrum communication which sets up two path search windows (see, JP 2001-223613). This apparatus includes a tracking window which performs a path search of near the center of search window within the limits, and a search window which performs a path search by later domain time sharing.

However, in the above-mentioned conventional receiving apparatus, since cell search processing and path search processing operate independently, there is a following problem. That is, it is necessary to perform reception processing after newly performed path search processing, when communication were started between a new base station.

SUMMARY OF THE INVENTION

The present invention has been made to solve the above and other exemplary problems, and therefore an exemplary feature of the present invention is to adjust a path search window width in path search processing according to a stored path timing, after storing a path timing detected at the time of cell search processing. Another feature of the present invention is to reduce power consumption without receiving quality deteriorating, by adjusting the path search window width.

In order to attain the above-mentioned and other exemplary features, the present invention provides an exemplary receiving apparatus. The receiving apparatus includes a Radio Frequency (RF) unit which receives signals which are sent from a base station and transmitted via a plurality of paths (multi-path), a cell search unit which detects scrambling codes specific to the base station in received signals and generates timing information corresponding to the multi-path when the same scrambling code is detected in a plurality of timings, a path timing memory unit which stores each of the timing information on each of the multi-path, and a path search unit which controls search window width and search start timing in reference to the timing information of the same scrambling code to perform path search.

Also, in order to attain the above-mentioned and other exemplary features, the present invention provides an exemplary receiving method. The receiving method includes receiving Radio Frequency (RF) signals which are sent from a base station and transmitted via a plurality of paths (multi-path), detecting scrambling codes specific to the base station in received signals to generate timing information corresponding to the multi-path when the same scrambling code is detected in a plurality of timings, storing each of the timing information on each of the multi-path, and controlling search window width and search start timing in reference to the timing information of the same scrambling code to perform path search.

Furthermore, in order to attain the above-mentioned and other exemplary features, the present invention provides an exemplary program for executing the exemplary receiving method on a computer. The program includes each step which includes receiving Radio Frequency (RF) signals which are sent from a base station and transmitted via a plurality of paths (multi-path), detecting scrambling codes specific to the base station in received signals to generate timing information corresponding to the multi-path when the same scrambling code is detected in a plurality of timings, storing each of the timing information on each of the multi-path, and controlling search window width and search start timing in reference to the timing information of the same scrambling code to perform path search.

According to the above structure, the exemplary receiving apparatus of the present invention stores a path timing detected at time of cell search processing, and can adjust path search window width in path search processing in reference to the stored path timing.

Therefore, the exemplary receiving apparatus of the present invention detects the path timing according to change of surrounding environment at the time of cell search processing, and can adjust path search window width based on the path timing which received change of surrounding environment.

Moreover, when it is clear that surrounding environment is good, by narrowing path search window width, degradation of receiving quality is suppressed and power consumption is reduced.

BRIEF DESCRIPTION OF THE DRAWINGS

The above and other exemplary features, and advantages of the present invention will become more apparent from the following detailed description when taken in conjunction with the accompanying drawings wherein.

DETAILED DESCRIPTION OF THE EXEMPLARY EMBODIMENTS

Figure 1:
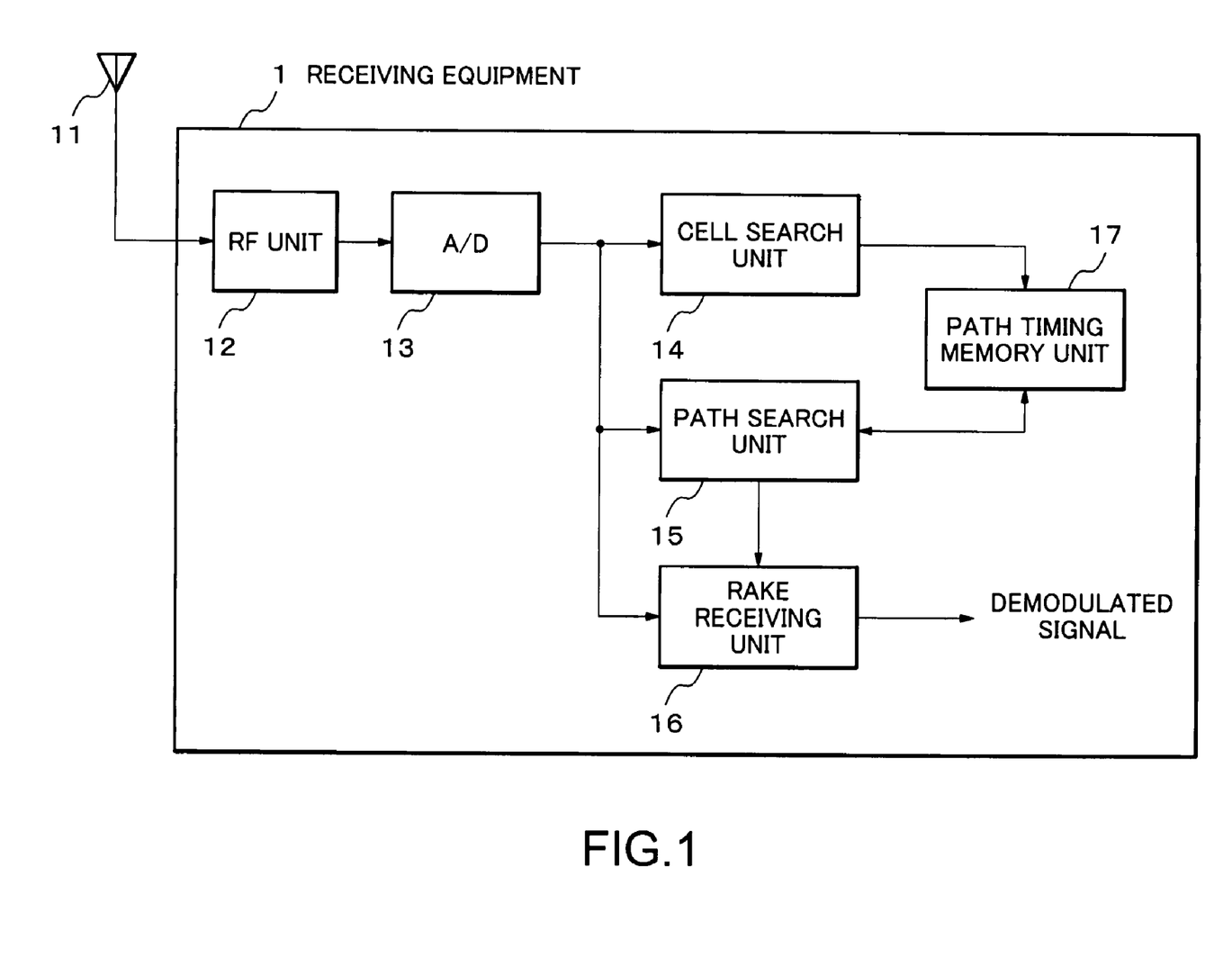
FIG. 1 is a block diagram showing a structure of a receiving apparatus according to an exemplary embodiment of the present invention.

Hereinafter, a description will be given in more detail of an exemplary receiving apparatus according to the present invention with reference to the accompanying drawings. FIG. 1 is a block diagram showing a structure of the receiving apparatus according to the exemplary embodiment of the present invention.

Referring to FIG. 1, the receiving apparatus 1 according to the embodiment of the present invention includes an antenna 11, a Radio Frequency (RF) unit 12, an analog-to-digital converter (A/D) 13, a cell search unit 14, a path search unit 15, a RAKE receiving unit 16, and a path timing memory unit 17.

Then, an operation of the respective units of the receiving apparatus 1 according to this exemplary embodiment will be described with reference to the accompanying drawings.

The Radio Frequency (RF) unit 12 changes signals of radio frequency caught with the antenna 11 to intermediate frequency or baseband frequency, and supplies to the analog-to-digital converter (A/D) 13. The radio signals is transmitted from a base station and spread via a plurality of paths.

The analog-to-digital converter (A/D) 13 changes analog signals frequency-converted in the RF unit 12 into digital signals. The digital signals are supplied to each of the cell search unit 14, the path search unit 15, and the RAKE receiving unit 16.

The cell search unit 14 inputs the digital signal output from the A/D 13, detects a neighboring cell and measures its received electric power, and detects a scrambling code and frame timing (head of slot, and head of frame) specific to the base station (not shown).

The path search unit 15 multiplies predetermined de-spreading codes with the digital signal output from the A/D 13, extracts a desired signal, and detects multi-paths included in the signal. And the timing information about the large path of the energy contained in the signal among plural paths is output.

The RAKE receiving unit 16 refers to timing signals output from the path search unit 15, performs a de-spreading process on each path of the digital signals which are output from the A/D 13, demodulates the original data from symbol data obtained by the de-spreading, and combines and outputs demodulated results.

The path timing memory unit 17 stores peak timing for every scrambling code specified in the cell search unit 14. Moreover, the timing information on the path output from the cell search unit 14 is stored.

Figure 2:
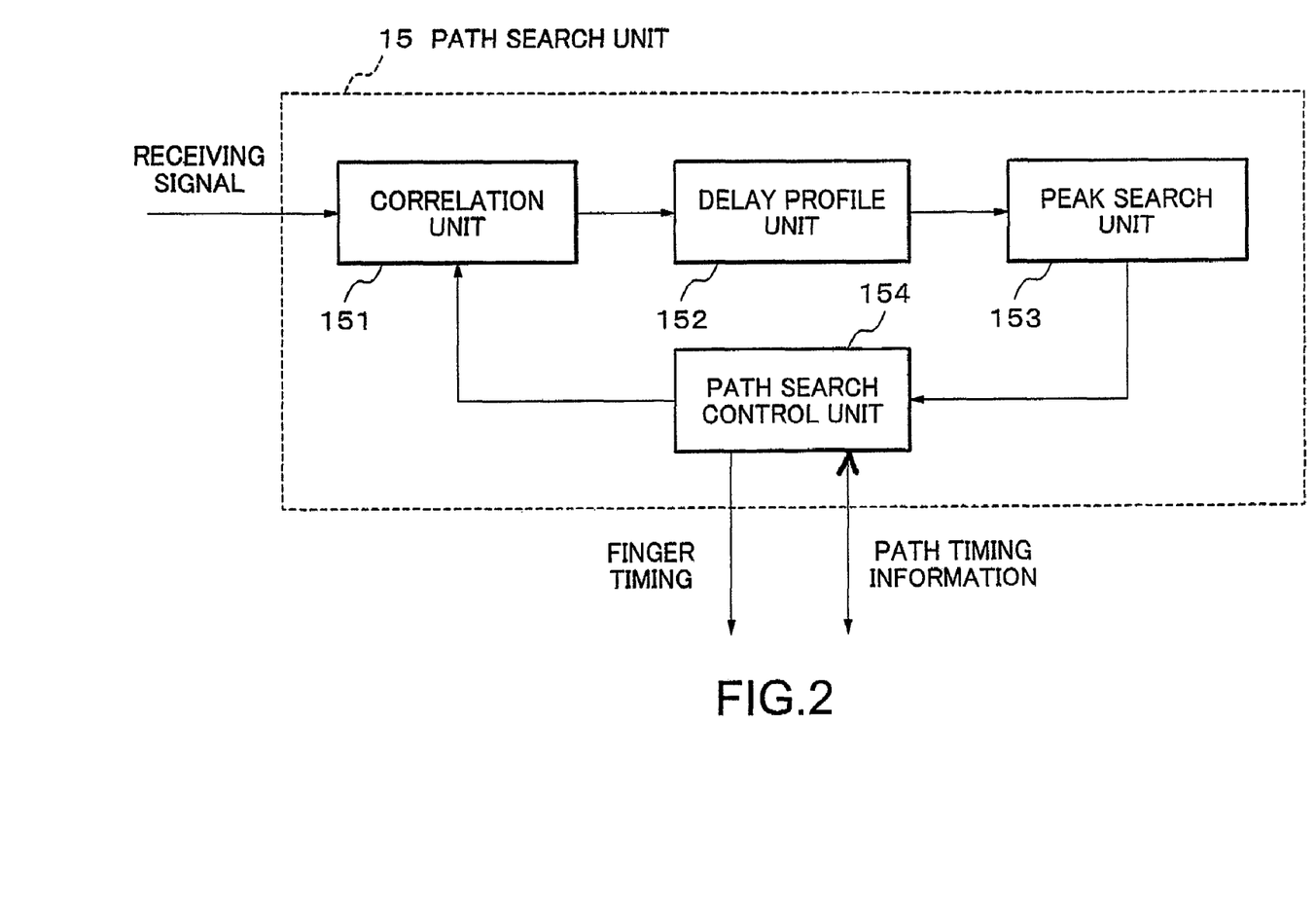
FIG. 2 is a block diagram showing a structure of a path search unit shown in FIG. 1.

Next, the structure of the path search unit 15 is explained. FIG. 2 is a block diagram showing the structure of the path search unit 15 shown in FIG. 1.

Referring to FIG. 2, the path search unit 15 includes a correlation unit 151, a delay profile unit 152, a peak search unit 153, and a path search control unit 154.

The correlation unit 151 performs de-spreading processing with a scrambling code and peak timing which are specified by the path search control unit 154 to the digital signal output from the A/D 13, and outputs a correlation value.

The delay profile unit 152 accumulates the correlation value output from the correlation unit 151, and creates a delay profile.

The peak search unit 153 detects the peak of a correlation value and generates the timing information with reference to the delay profile output from the delay profile unit 152.

The path search control unit 154 inputs the information about the path timing from the path timing memory unit 17, controls the whole of the path search unit 15, and supplies the timing information on a path to the RAKE receiving unit 16.

Here, the receiving method according to the embodiment of the present invention can be executed using a computer. When it is executed on the computer, programs for executing the cell search processing, the path search processing, and the path search control are stored in a disk, a semiconductor memory, or any other recording media. The programs are loaded into the computer. The computer performs the operation in accordance with the loaded program, whereby the cell search unit 14, the path search unit 15, the RAKE receiving unit 16, the path search control unit 154 of the path search unit 15, and so on are executed on the computer.

Figure 3:
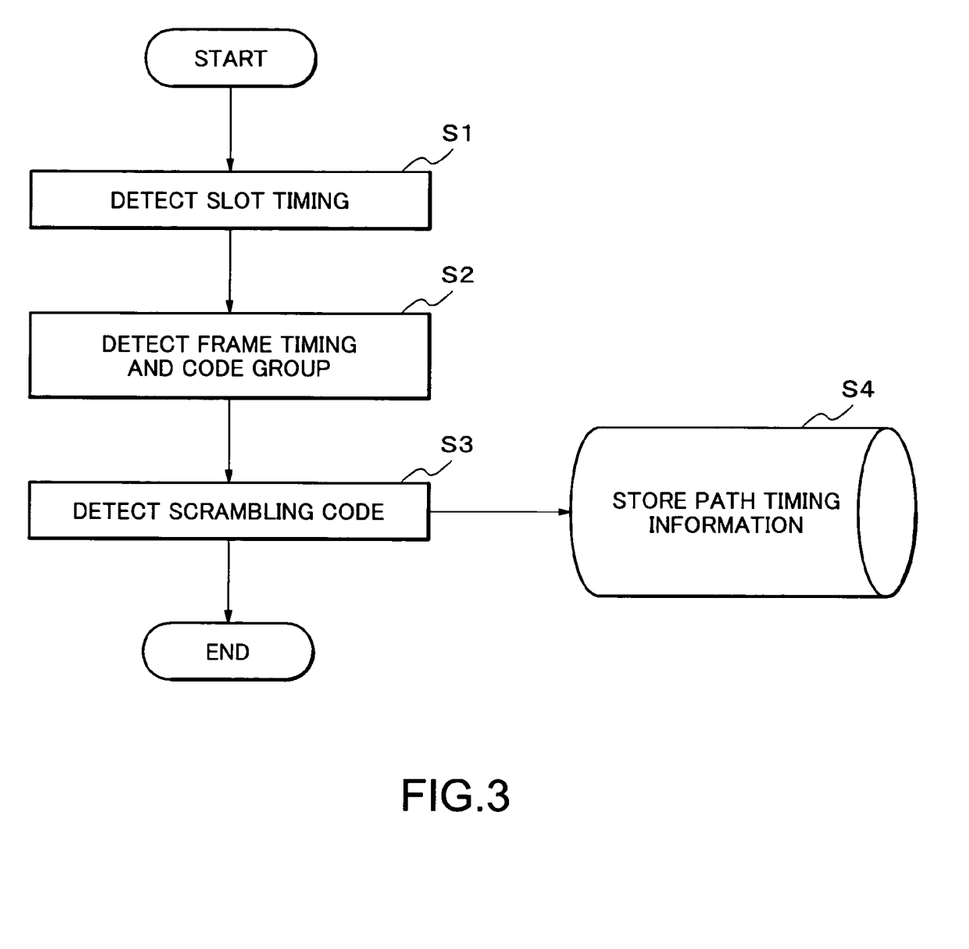
FIG. 3 is a flowchart for explaining an exemplary operation of cell search processing in a cell search unit shown in FIG. 1.
Figure 4:
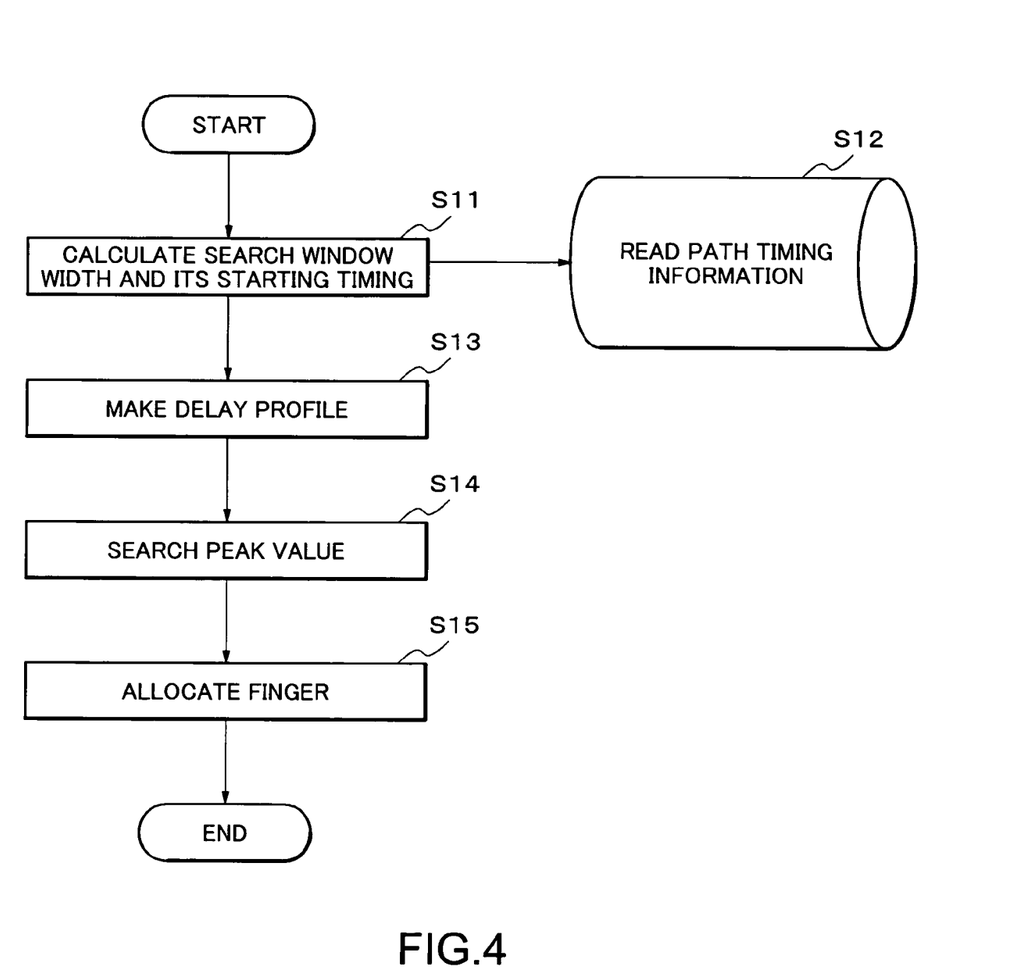
FIG. 4 is a flowchart for explaining an exemplary operation of path search processing in a path search unit shown in FIG. 1.

Next, operation of the receiving apparatus 1 according to this exemplary embodiment will be described. FIG. 3 is a flowchart for explaining an exemplary operation of cell search processing in the cell search unit shown in FIG. 1. FIG. 4 is a flowchart for explaining an exemplary operation of path search processing in a path search unit shown in FIG. 1.

First, operation of cell search processing will be explained. As a cell search method, three-step cell search (see, "Annex C(Informative): Cell search procedure" [3GPP TS25.214 V6.3.0(2004-09)]) is already known, as prescribed by 3GPP (3rd Generation Partnership Project).

The cell search unit 14 detects the head of a slot by detecting P-SCH (Primary Synchronization Channel) contained at a head of the slot of received signals (FIG. 3 step S1). The head (slot timing) of a slot is detectable by having de-scrambled P-SCH by PSC (Primary Synchronization Code) of a diffusion mark common to all cell all slots, and being reverse-spread in PSC.

Then, the cell search unit 14 detects S-SCH (Secondary Synchronization Channel) contained at the head of each slot of a received signal, and detects the head (frame timing) and code group of a frame (FIG. 3 step S2). The head of a frame is specified by tracing the predetermined number given to SSCH.

Continuing furthermore, the cell search unit 14 detects the head of P-CPICH (Primary Common Pilot Channel) from the frame timing and the code group detected previously, and specifies the scrambling code assigned to the base station (cell) (FIG. 3 step S3).

After finishing the above operation, this receiving apparatus starts reception of annunciation signal specific to a system or a cell.

Here, the cell search unit 14 may detect the same scrambling code to a plurality of timing in the above-mentioned processing. It can be judged that each of timing detected in the same scrambling code is a multi-path. The cell search unit 14 stores the path timing and the correlation value of each base station which were detected by the above-mentioned processing in the path timing memory unit 17 (FIG. 3 step S4).

Then, operation of the path search unit 15 is explained. The path search control unit 154 of the path search unit 15 reads the scrambling codes and its corresponding timing information from the path timing memory unit 17, and determines window width and search start timing of a path search (FIG. 4 steps S11 and S12).

The path search control unit 154 specifies scrambling codes, window width, and window start timing to the correlation unit 151, and directs creation of a delay profile (FIG. 4 step S13). The correlation unit 151 reverse-diffuses CPICH (Common Pilot Channel), and creates a delay profile.

When the peak search unit 153 completes creation of a delay profile, it detects a peak-timing and a peak correlation value from the delay profile, and informs them to the path search control unit 154 (FIG. 4 step S14).

The path search control unit 154 supplies peak timing and the finger timing based on a peak correlation value to the RAKE receiving unit 16 (FIG. 4 step S15).

Figure 5:
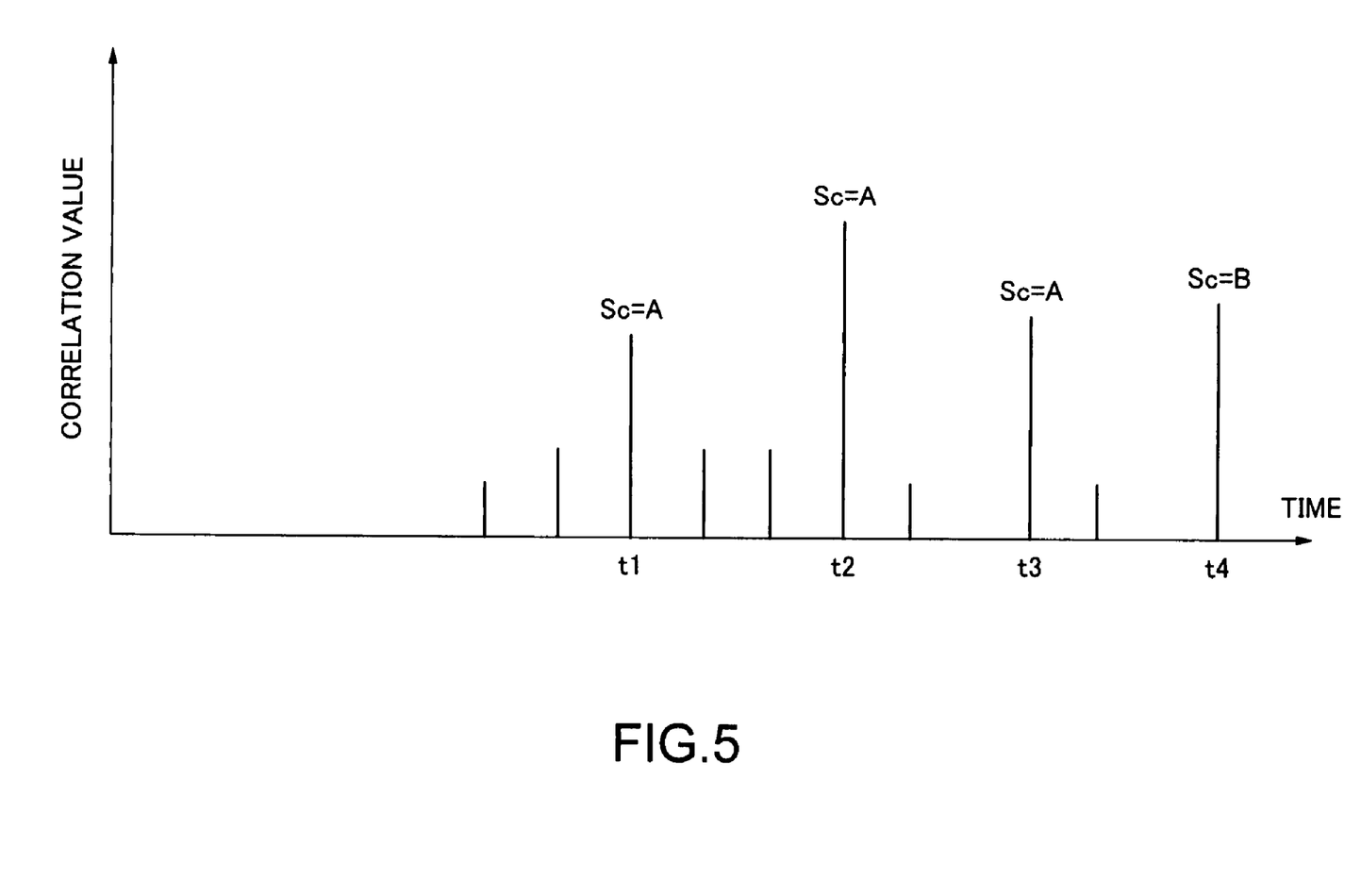
FIG. 5 is a figure showing a correlation value profile of P-SCH obtained by cell search processing.
Figure 6:
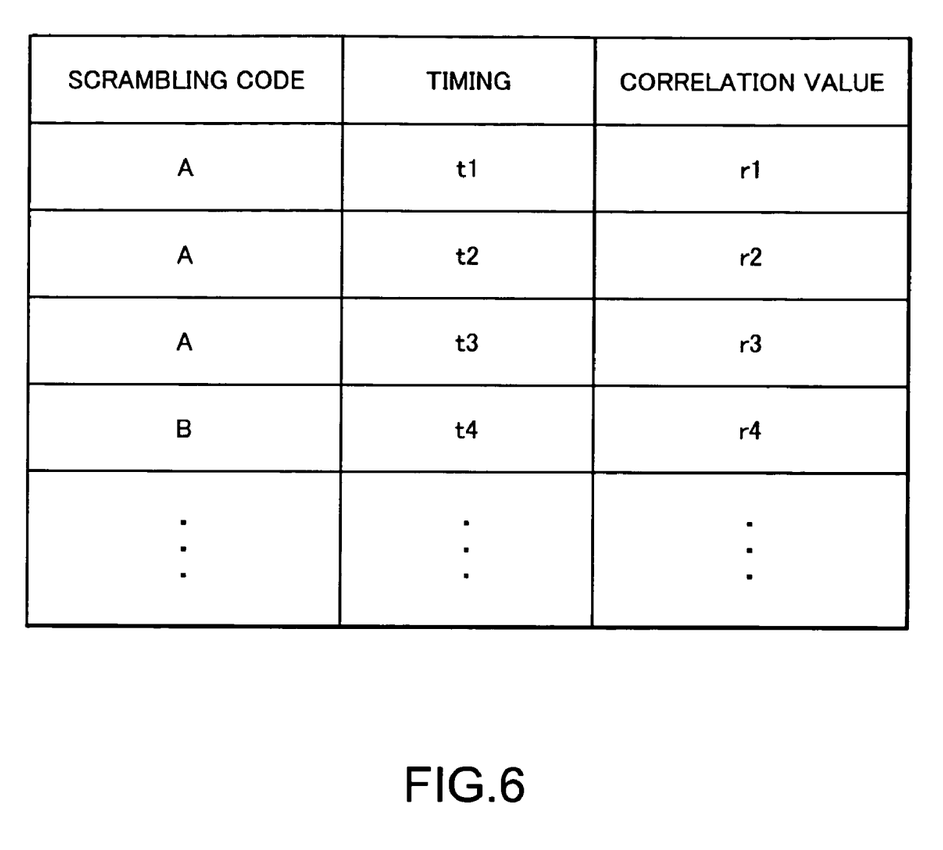
FIG. 6 is a figure showing an example of data sequence in a table equipped with a path timing memory unit shown in FIG. 1.
Figure 7:
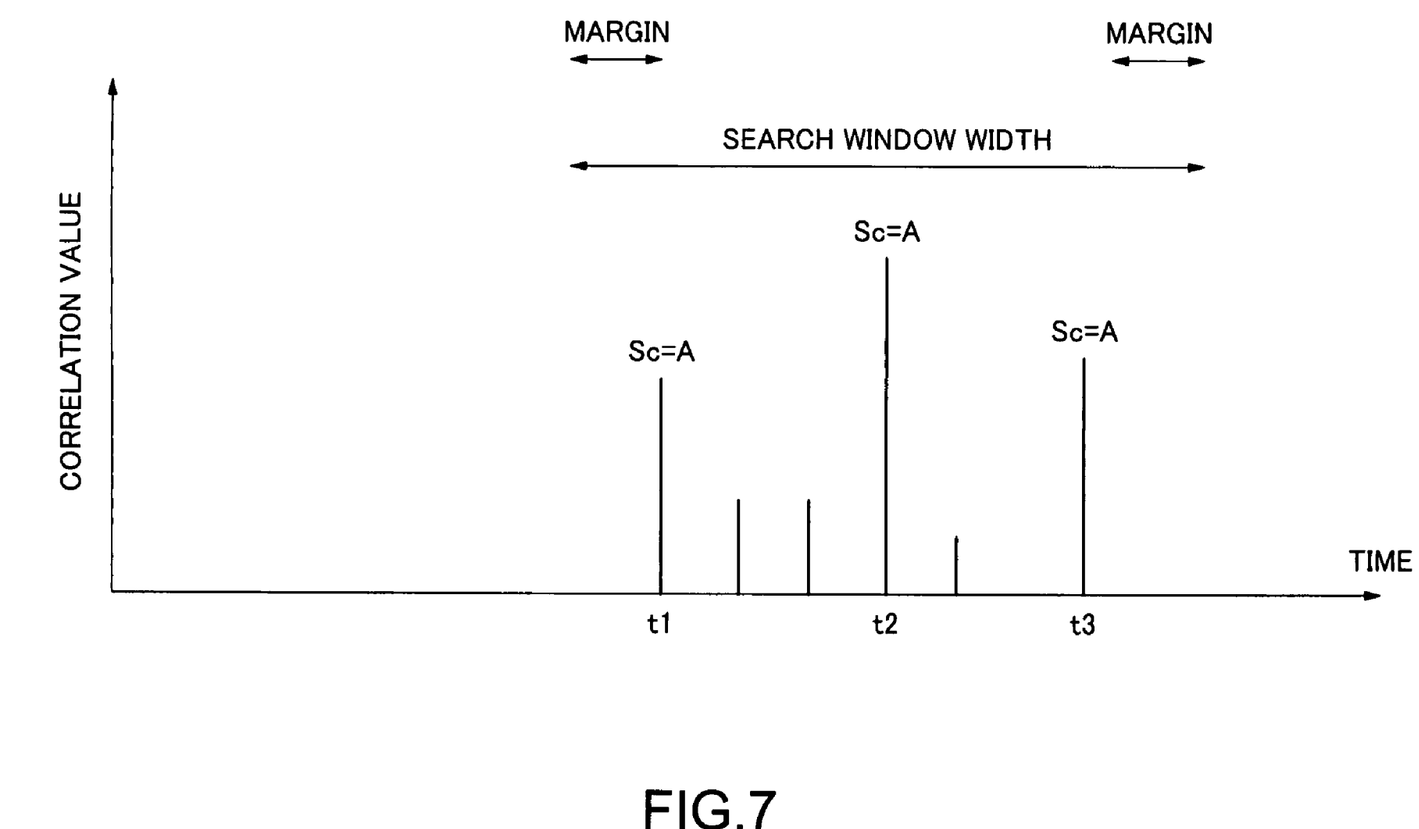
FIG. 7 is a figure showing a relation between profile window start timing and window width.

Next, storage method of the path timing to the path timing memory unit 17 is explained. FIG. 5 is a figure showing a correlation value profile of P-SCH obtained by cell search processing. FIG. 6 is a figure showing an example of data sequence in a table equipped with the path timing memory unit shown in FIG. 1. FIG. 7 is a figure showing a relation between profile window start timing and window width.

FIG. 5 shows the correlation value corresponding to a plurality of paths and each path which were obtained by the cell search mentioned above. In FIG. 5, the path corresponding to timing t1, t2, t3, and t4 is detected as an effective path as a path beyond a predetermined threshold level. For every scrambling code, this effective path is stored in the path timing memory unit 17, as shown in FIG. 6. That is, timing (t1, t2, t3, . . . ) and a correlation value (r1, r2, r3, . . . ) are stored at every scrambling code (A, B, C, . . . ) at the path timing memory unit 17.

The path search control unit 154 inputs the path timing information shown in FIG. 6, determines window width and search start timing shown in FIG. 7.

The search start timing should bring the amount of margins forward to the earliest path timing t1, and window width should add the amount of 2× margins to the path timing difference (t3−t1). However, the maximum of window width is decided beforehand, in consideration of the case where scrambling code detection is mistaken by the cell search unit 14, when a path timing difference (t3−t1) exceeds the maximum of window width, maximum of window width is made into window width, and setting window width and the timing of a window start are decided focusing on the timing of the maximum correlation value.

Thus, in this case of the operation, even if a plurality of paths with which propagation delay differ are caught by surrounding environment, path search window width can be set as required sufficient range. Therefore, degradation of receiving quality can be suppressed and the power consumption concerning a path search can be reduced.

In this embodiment of the present invention, method to decide window width can be devised further. That is, the path search processing can be performed every predetermined cycle corresponding to change of surrounding environment, when communication with a base station is started. In this case, the path search control unit 154 updates the information stored in the path timing memory unit 17 by the peak search result (path timing and path correlation value) for every path search processing. And the path search control unit 154 determines window width and window start timing like the above-mentioned processing based on the updated path information at the time of next path search processing.

According to the above-mentioned explanation, even if the amount of delay of a path had change due to a change in the surrounding environment, path search processing can be performed each time by using window width asked by cell search processing. That is, compared with the conventional technology of using the result of path search processing for the determination of window width, reception processing can be performed quickly. Furthermore, since window width to be used is restricted to the cell for a search, consumption of electric power can be held down except for unnecessary window width.

Furthermore, a method to decide window width can be devised. That is, the cell search processing can also be performed during communication with a base station for search of other neighboring base stations in the cell search unit 14 with a fixed cycle. In operation of the cell search processing shown in FIG. 3, since the cell under communication is also detected, the path timing memory unit 17 is updated for the path information at that time.

Also, the processing which is shown in the flowcharts in FIGS. 3 to 4 are executed with their functions by storing the program for receiving method in a recording medium such as a flexible disk, a CD-ROM, an optical magnetic disk, RAM, or ROM, loading it into the computer via a drive unit for the storage medium, and executing it.

In addition, this invention is applicable to an apparatus using the receiving circuit of a CDMA communication in a mobile terminal, radio modem of a Personal Computer Memory Card type, etc.

While this invention has been described in connection with certain exemplary embodiments, it is to be understood that the subject matter encompassed by way of this invention is not to be limited to those specific embodiments. On the contrary, it is intended for the subject matter of the invention to include all alternative, update, and equivalents as can be included within the spirit and scope of the following claims.

Further, the inventers' invention is to retain all equivalents of the claimed invention even if the claims are amended during prosecution.

What is claimed is:

1. A receiving apparatus for receiving and demodulating signals sent from a base station, the receiving apparatus comprising:

a Radio Frequency (RF) unit which receives signals including signals sent from the base station and transmitted via a plurality of paths (multi-path signals), and outputs received signals;

a cell search unit which detects a scrambling code specific to the base station in one or more of the signals output by the RF unit and generates path timing information corresponding to the multi-path signals having the same scrambling code;

a path timing memory unit which stores the path timing information generated by the cell search unit for each of the multi-path signals; and a path search unit which controls a search window width and search start timing based on the path timing information, stored in the path timing memory unit, for the received signals that have the same scrambling codes, to perform a path search.

2. The receiving apparatus according to claim 1, wherein the cell search unit performs the cell search with a predetermined cycle, and supplies the path timing information to the path timing memory unit for updating the path timing memory unit.

3. The receiving apparatus according to claim 1, wherein the search window width and search start timing are adjusted according to an amount of delay of the multi-path signals corresponding to the generated path timing information.

4. The receiving apparatus according to claim 1, wherein the path search unit receives the signal output from the RF unit and performs a path search using a search window having the search window width, wherein the path search begins according to the search start timing.

5. A receiving method for receiving and demodulating signals sent from a base station, the receiving method comprising:

a receiving operation comprising receiving Radio Frequency (RF) signals which are sent from the base station and transmitted via a plurality of paths (multi-path signals) and outputting received signals;

a detecting operation comprising detecting scrambling codes specific to the base station in the received signals output in the receiving operation, and generating path timing information corresponding to the multi-path signals having the same scrambling code;

a storing operation comprising storing in a memory the path timing information generated in the detecting operation for each of the multi-path signals; and a controlling operation comprising controlling a search window width and search start timing based on the path timing information stored in the memory by the storing operation, for the received signals having the same scrambling code detected in the detecting operation, to perform a path search.

6. The receiving method according to claim 5, wherein the controlling operation further comprising detecting the scrambling code in a predetermined cycle, and generating the path timing information to update the memory.

7. The receiving method according to claim 5, wherein the search window width and search start timing are adjusted according to an amount of delay of the multi-path signals corresponding to the generated path timing information.

8. A computer readable recording medium containing a program of instructions for enabling a computer, serving as a receiving apparatus for receiving and demodulating signals sent from a base station, to execute processes comprising:

a detecting process comprising detecting a scrambling code specific to the base station in multi-path signals transmitted via a plurality of paths and originating from a signal transmitted from the base station, and generating path timing information corresponding to the multi-path signals;

a storing process comprising storing in a memory each of the path timing information generated by the detecting process; and a controlling process comprising controlling a search window width and a search start timing based on the path timing information, stored in the memory by the storing process, of the multi-path signals having the same scrambling code detected by the detecting process, to perform a path search.

9. The computer readable recording medium containing the program according to claim 8, wherein the controlling process further comprises detecting the scrambling code in a predetermined cycle, and generating the path timing information for updating the memory.

10. The computer readable recording medium containing the program according to claim 8, wherein the search window width and search start timing are adjusted according to an amount of delay for the multi-path signals corresponding to the generated path timing information.

11. A receiving apparatus for receiving and demodulating signals sent from a base station, the receiving apparatus comprising:

a cell search unit that determines whether signals received by the receiving apparatus are multi-path signals transmitted via a plurality of paths and originating from a transmitted signal sent from the base station, and in response to determining that said multi-path signals were transmitted by the base station, generating timing information for the multi-path signals;

a path timing memory unit that stores the timing information generated by the cell search unit; and a path search unit that controls a search window width and a search start timing based on the timing information stored in the path timing memory unit, to perform a path search wherein for each multi-path signal that the cell search unit generates timing information, the path timing memory unit stores a correlation value and a corresponding time value, and the path search unit sets the search window width to include the correlation values having the largest and smallest time values, wherein said correlation values correspond to the multi-path signals originating from the signal transmitted by the base station.

12. The receiving apparatus according to claim 11, wherein the transmitted signal includes a scrambling code specific to the base station, and wherein the cell search unit determines that the signals received by the receiving apparatus were transmitted by the base station by detecting said scrambling code in the multi-path signals.

13. The receiving apparatus according to claim 11, wherein the path search unit sets the search window width to have a maximum value at a time equal to the time of said correlation value having the largest time value plus an upper margin.

14. The receiving apparatus according to claim 13, wherein the path search unit sets the search window width to have a minimum value at a time equal to the time of said correlation value having the smallest time value less a lower margin.

* * * * *